US007814177B2

(12) United States Patent
Sekiya

(10) Patent No.: US 7,814,177 B2
(45) Date of Patent: Oct. 12, 2010

(54) MAIL MAGAZINE DISTRIBUTION SYSTEM

(75) Inventor: Kazuma Sekiya, Ota-Ku (JP)

(73) Assignee: Disco Corporation, Tokyo (JP)

( * ) Notice: Subject to any disclaimer, the term of this patent is extended or adjusted under 35 U.S.C. 154(b) by 67 days.

(21) Appl. No.: 12/408,683

(22) Filed: Mar. 21, 2009

(65) Prior Publication Data

US 2009/0259733 A1 Oct. 15, 2009

(30) Foreign Application Priority Data

Apr. 14, 2008 (JP) ............................. 2008-105022

(51) Int. Cl.
*G06F 15/16* (2006.01)
(52) U.S. Cl. ..................................... 709/219
(58) Field of Classification Search .................. 709/219
See application file for complete search history.

(56) References Cited

U.S. PATENT DOCUMENTS 5,819,032 A * 10/1998 de Vries et al. ............. 709/250

7,149,783 B2 * 12/2006 Frolik et al. ................. 709/207
7,290,285 B2 * 10/2007 McCurdy et al. ............... 726/27
7,539,937 B2 * 5/2009 Silverbrook et al. ......... 715/241
7,539,938 B2 * 5/2009 Ross et al. ................... 715/255

FOREIGN PATENT DOCUMENTS

JP A 2003-99367 4/2003

* cited by examiner

*Primary Examiner*—Larry Donaghue
(74) *Attorney, Agent, or Firm*—Greer, Burns & Crain, Ltd.

(57) ABSTRACT

A mail magazine distribution system includes an information receiver side including a terminal having transmission and reception functions, and an information provider side including a server which in turn includes a database in which accumulated information is stored and a transmission unit for transmitting the accumulated information from the database to the terminal. The server of the information provider side includes a reception unit for receiving return information from the terminal. The transmission unit transmits, at timing determined in advance or when the reception unit receives distribution request information from the terminal, part of the accumulated information to the terminal.

2 Claims, 3 Drawing Sheets

FIG. 3
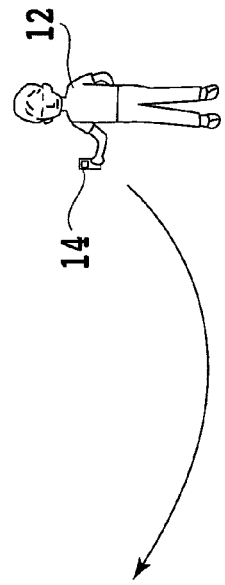
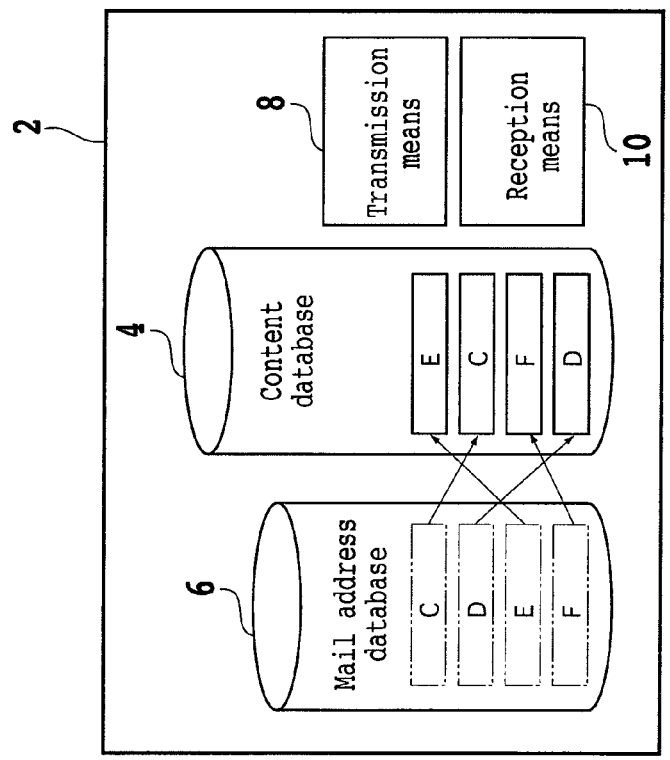

MAIL MAGAZINE DISTRIBUTION SYSTEM

BACKGROUND OF THE INVENTION

1. Field of the Invention

This invention relates to a mail magazine distribution system for distributing a mail magazine by an electronic mail.

2. Description of the Related Art

A mail magazine distribution system is a kind of information providing service distributed through an electronic mail. According to the mail magazine distribution system, a weather forecast, fortune-telling, new menu information of a restaurant and so forth are periodically sent to a mail magazine user registered through an electronic mail. The mail magazine user can subscribe to information periodically only by establishing a connection to a site which provides a service and registering a mail address of the mail magazine user itself. Usually, the subscription is free. The information can be read not only from a personal computer but also from a portable telephone set ready for the Internet. By the mail magazine distribution system, information accumulated in advance in a database of an information provider is distributed periodically to the user, and the user can acquire information, which interests the user itself, periodically and with certainty (refer to, for example, Japanese Patent Laid-open No. 2003-99367).

Although information as a mail magazine is periodically distributed from the information provider side to the user side, the user to whom the mail magazine is distributed is different in situation every time. In other words, the user is different in physical busyness, emotional stability and so forth every time. When the user is physically free or emotionally stable, the user of the mail magazine may sometimes want to acquire next information quickly. In such a case, if information is distributed only at timing determined in advance, then the distributor loses its chance of distribution, and also to the user, this is not good in convenience in use.

SUMMARY OF THE INVENTION

Therefore, the object of the present invention resides in provision of a mail magazine distribution system which can distribute information in response to a request by a user.

In accordance with an aspect of the present invention, there is provided a mail magazine distribution system including an information receiver side including a terminal having transmission and reception functions, and an information provider side including a server which in turn includes a database in which accumulated information is stored and transmission means for transmitting the accumulated information from the database to the terminal. The server of the information provider side includes reception means for receiving return information from the terminal. The transmission means transmits, at timing determined in advance or when the reception means receives distribution request information from the terminal, part of the accumulated information to the terminal.

With the present configuration, the mail magazine distribution system which can distribute information in response to a demand of a user. Further, since also periodical distribution is carried out simultaneously, it is possible to acquire information at the lowest pace periodically and with certainty.

Preferably, the server installed on the information provider side changes the order of transmission of the accumulated information based on evaluation information from the terminal.

With the mail magazine distribution system, the information provider can know what information is demanded by the user, and the user can acquire useful information efficiently.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 3 is a diagram of another mail magazine distribution system of the present invention wherein evaluation information is sent.

DETAILED DESCRIPTION OF THE PREFERRED EMBODIMENTS

Figure 1:
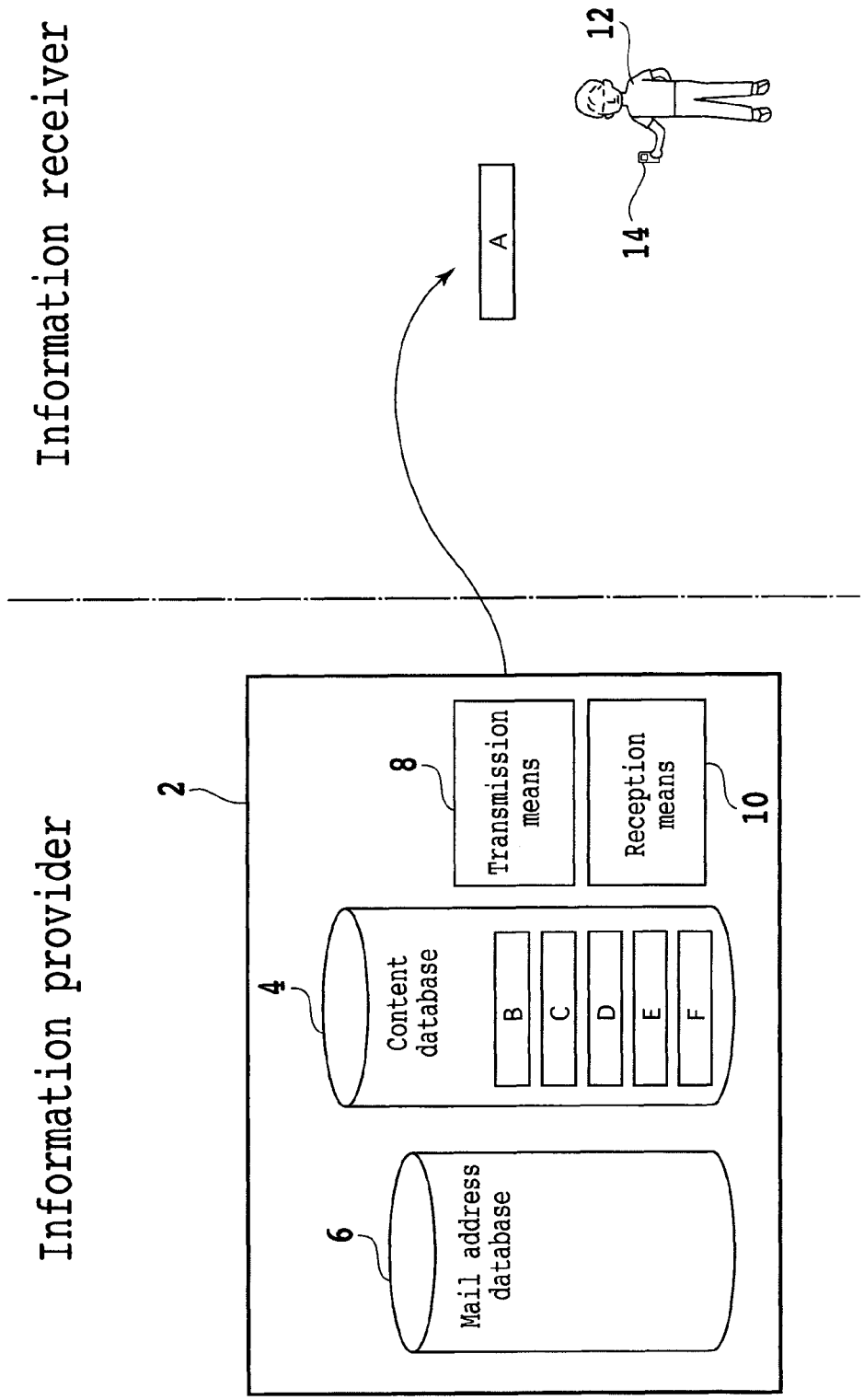
FIG. 1 is a schematic diagram of a popular mail magazine distribution system.

In the following, the present invention is described in detail in connection with embodiments thereof with reference to the drawings. First, a conventional popular mail magazine distribution system is described briefly with reference to FIG. 1. A server 2 of the information provider side includes a content database 4 in which information to be distributed is accumulated, and a mail address database 6 in which mail addresses of mail magazine readers are stored. A mail magazine is generally formed from a header and a hooter, and various pieces of information (contents) sandwiched between the header and the footer. A user of the mail magazine would access, for example, a homepage of the information provider and register a mail address. Consequently, the mail address is stored into the mail address database 6 of the server 2. The server 2 further includes transmission means 8 for transmitting distribution information and reception means 10 for receiving distribution request information and so forth from a user (information receiver) 12 of the mail magazine.

The user 12 of the mail magazine would read the mail magazine through a personal computer, a portable telephone set 14 shown in the figure or the like. The server 2 of the information provider side distributes part of the information accumulated in the content database 4, for example, information A, to the user 12, for example, after every one month. After one month, information B is distributed to the user 12, and the user can periodically acquire information, which interests the user itself, with certainty. It is to be noted that the reading situation of each user is stored individually in the mail address database 6.

Figure 2:
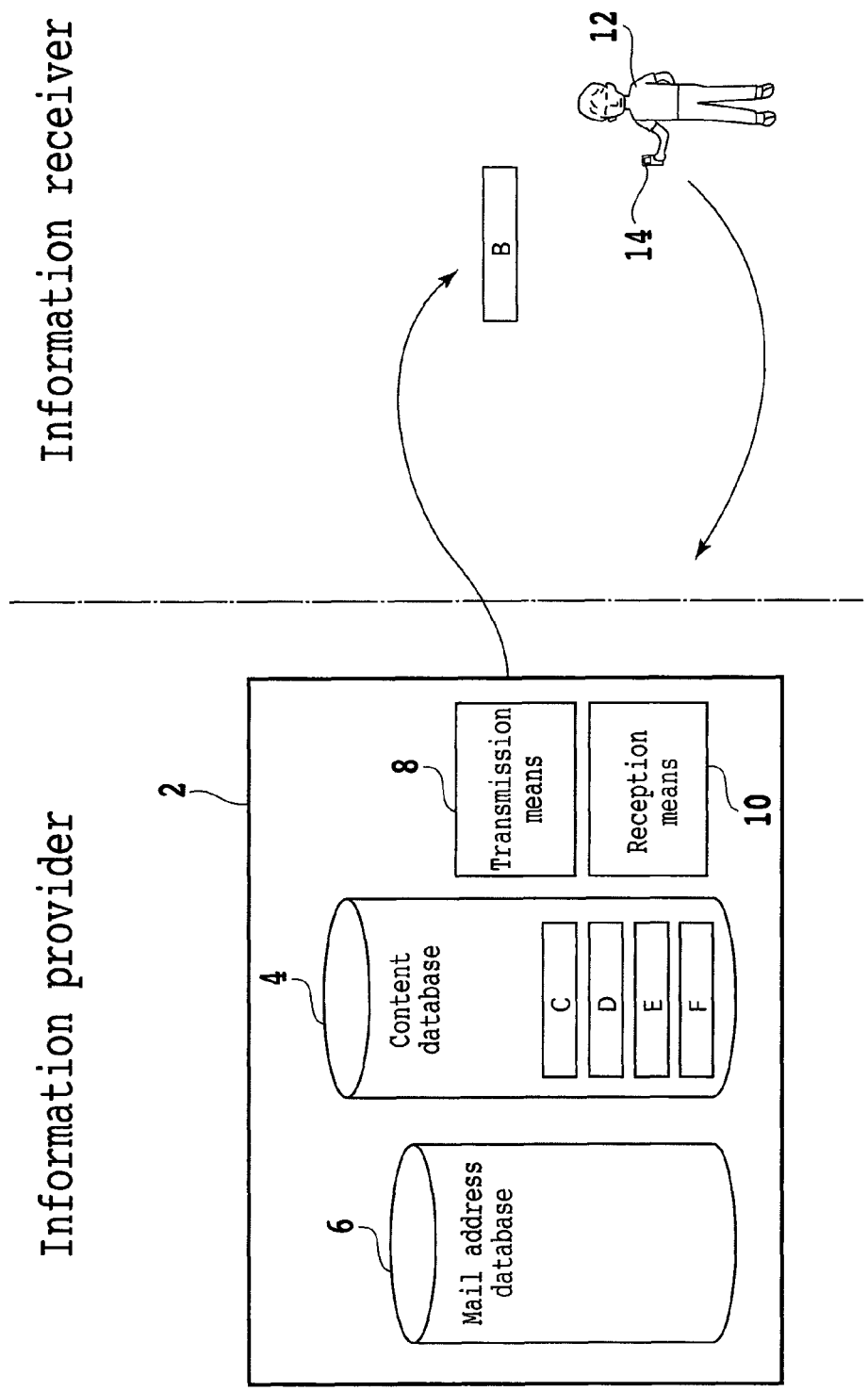
FIG. 2 is a diagram of a mail magazine distribution system of the present invention.

However, in the conventional mail magazine distribution system, since information is periodically distributed one-sidedly, even if a user wants to acquire next information quickly, the user must wait till the next distribution timing. Therefore, in a mail magazine distribution system of the present invention, distribution request information is transmitted from a terminal such as the portable telephone set 14 which has a transmission and reception function as seen in FIG. 2. If the reception means of the server 2 of the information provider receives this distribution request information, then the server 2 transmits the information B, which is scheduled to be distributed at next distribution timing, from within the information accumulated in the content database 4 to the portable telephone set 14 of the user 12 through the transmission means 8. Consequently, the user of the mail magazine can read the information to be distributed next time promptly in accordance with the desire of the user itself.

Also it is possible for the user 12 of the mail magazine to evaluate information distributed thereto and transmit the evaluation information to the information provider side as illustrated in FIG. 3. This evaluation information is formed from a return mail of the questionnaire type and so forth, and the information provider side can re-arrange information, which interests the user, into the order of priority based on the evaluation information from a great number of users. Beginning with the next distribution timing, information is distributed to the great number of users in accordance with the order of priority. Where evaluation information is received from the users in this manner, the information provider can know what information is demanded by the users, and the users can acquire useful information efficiently. The distribution request information transmitted by the users may simultaneously include the evaluation information.

Further, if the evaluation information is managed in accordance with the age, sex, length of continuous employment, type of occupation and so forth of each reader, then such a fact that the information A is favorite to women in their thirties while the information B is favorite to men in their teens is found, or in the case of a mail magazine for in-house education or the like, such a case that information C is evaluated by staff members whose length of continuous employment is more than five years while information D is evaluated by staff members in a mechanical development department is found. Thus, the reader can acquire more useful information more efficiently through the mail magazine.

The mail magazine distribution system of the present invention has a high value if it is applied, for example, to distribution of teaching materials such as texts. Since the minimum information to be learned is distributed periodically, a user of the mail magazine can acquire and study the minimum information periodically. However, when a user is free or is emotionally stable, if the user transmits distribution request information to the information provider side, then it can acquire the next information quickly. Therefore, the speed of the study can be increased.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A mail magazine distribution system, comprising:
    an information receiver side including a terminal having transmission and reception functions; and
    an information provider side including a server which in turn includes a database in which accumulated information is stored and transmission means for transmitting the accumulated information from said database to said terminal,
    said server of said information provider side including reception means for receiving return information from said terminal, and
    said transmission means transmitting, at timing determined in advance or when said reception means receives distribution request information from said terminal, part of the accumulated information to said terminal.

2. The mail magazine distribution system according to claim 1, wherein said server changes the order of transmission of the accumulated information based on evaluation information from said terminal.

* * * * *